US010627881B2

United States Patent
Mishra et al.

(10) Patent No.: US 10,627,881 B2
(45) Date of Patent: Apr. 21, 2020

(54) BACK POWER PROTECTION (BPP) IN A SYSTEM ON A CHIP (SOC) WITH CRITICAL SIGNALING SCHEME

(71) Applicant: QUALCOMM Incorporated, San Diego, CA (US)

(72) Inventors: Lalan Jee Mishra, San Diego, CA (US); Richard Dominic Wietfeldt, San Diego, CA (US); Chiew-Guan Tan, San Diego, CA (US); Alex Kuang-Hsuan Tu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 15/952,071

(22) Filed: Apr. 12, 2018

(65) Prior Publication Data

US 2019/0317579 A1    Oct. 17, 2019

(51) Int. Cl.
   *G06F 11/00*    (2006.01)
   *G06F 1/26*     (2006.01)
   *G06F 11/20*    (2006.01)
   *G06F 11/30*    (2006.01)
   *G06F 11/07*    (2006.01)

(52) U.S. Cl.
   CPC ............ *G06F 1/26* (2013.01); *G06F 11/0721* (2013.01); *G06F 11/2015* (2013.01); *G06F 11/3058* (2013.01); *G06F 11/3062* (2013.01)

(58) Field of Classification Search
   CPC .......... G06F 1/26; G06F 1/30; G06F 11/0721; G06F 11/2015; G06F 11/3058; G06F 11/3062

See application file for complete search history.

(56) References Cited

U.S. PATENT DOCUMENTS

| 2004/0166869 | A1* | 8/2004 | Laroia | H04L 1/1607 455/450 |
| 2014/0068354 | A1* | 3/2014 | Park | G06F 11/0742 714/55 |
| 2015/0198987 | A1 | 7/2015 | Park et al. | |
| 2016/0077905 | A1* | 3/2016 | Menon | G06F 11/3648 |

(Continued)

OTHER PUBLICATIONS

Huh Y., "Future Direction of Power Management in Mobile Devices", IEEE Asian Solid-State Circuits Conference, Nov. 14-16, 2011, pp. 1-4.

*Primary Examiner* — Joshua P Lottich (74) *Attorney, Agent, or Firm* — Loza & Loza, LLP/Qualcomm (57) ABSTRACT

Aspects of the disclosure are directed to a System on a Chip (SOC). In accordance with one aspect, a method for implementing back power protection (BPP) in a SOC includes transmitting a first back power protection (BPP) supply output from a first power management integrated circuit (PMIC) to a logical OR function; transmitting a second back power protection (BPP) supply output from a second power management integrated circuit (PMIC) to the logical OR function; using the logical OR function to generate a composite BPP power based on the first BPP supply output and the second BPP supply output; and inputting the composite BPP power to a baseband processor (BP), wherein the baseband processor (BP) is coupled to the second PMIC.

30 Claims, 4 Drawing Sheets

(56) References Cited

U.S. PATENT DOCUMENTS

| | | |
|---|---|---|
| 2016/0079747 A1* | 3/2016 | Srivastava ............... H02H 3/18 |
| | | 361/84 |
| 2016/0218499 A1* | 7/2016 | Ji ............................. H02H 3/18 |
| 2016/0357245 A1 | 12/2016 | Heo et al. |
| 2017/0170646 A1 | 6/2017 | Srivastava et al. |
| 2017/0179887 A1 | 6/2017 | Henzler et al. |
| 2019/0036495 A1* | 1/2019 | Ng .......................... H03F 3/245 |
| 2019/0204893 A1* | 7/2019 | Rotem .................. G06F 1/3287 |

* cited by examiner

| BPP Monitor Read Value | Definitions |
|---|---|
| 1 | Baseband Processor Operating Normally |
| 0 | Baseband Processor Operating Critical Issue |

FIG. 4

510 — Transmit a first back power protection (BPP) supply output from a first power management integrated circuit (PMIC) and transmit a second back power protection (BPP) supply output from a second power management integrated circuit (PMIC) to a logical OR function

520 — Generate a composite BPP power based on the first BPP supply output and the second BPP supply output

530 — Input the composite BPP power to a baseband processor (BP), wherein the BP is coupled to the second PMIC

540 — Generate a time-critical alert signal based on the composite BPP power

550 — Transmit the time-critical alert signal to at least one of the first PMIC and second PMIC

FIG. 5

BACK POWER PROTECTION (BPP) IN A SYSTEM ON A CHIP (SOC) WITH CRITICAL SIGNALING SCHEME

TECHNICAL FIELD

This disclosure relates generally to the field of back power protection, and, in particular, to a back power protection (BPP) in a System on a Chip (SOC).

BACKGROUND

A complex electronics system for an application, for example a smartphone, laptop computer, etc., may have a variety of interconnected complex chips, each known as a System on a Chip (SOC). Each SOC may include a processor, memory, and external interfaces to perform certain functions. Functions that a SOC may perform include computation, audio processing, video processing, signal processing, sensing, filtering, etc. In addition, each SOC may have a separate power management integrated circuit (PMIC) to supply it with regulated dc power at different voltage levels. Thus, inter-process communication (IPC) and control signaling among the various chips are needed.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a back power protection (BPP) in a System on a Chip (SOC). Accordingly, a method for implementing back power protection (BPP) in a System on a Chip (SOC), the method including transmitting a first back power protection (BPP) supply output from a first power management integrated circuit (PMIC) to a logical OR function; transmitting a second back power protection (BPP) supply output from a second power management integrated circuit (PMIC) to the logical OR function; using the logical OR function to generate a composite BPP power based on the first BPP supply output and the second BPP supply output; and inputting the composite BPP power to a baseband processor (BP), wherein the baseband processor (BP) is coupled to the second PMIC.

In one example, the first PMIC is coupled to an application processor (AP) and wherein the application processor (AP) serves as a master processor. In one example, the second PMIC is coupled to the baseband processor (BP) and wherein the baseband processor (BP) serves as a communications processor. In one example, the application processor (AP) and the baseband processor (BP) are both coupled to a common multi-drop data bus in the SOC. In one example, the first BPP supply output is carried on a first BPP rail and the second BPP supply output is carried on a second BPP rail, wherein the first BPP rail is a separate rail from the second BPP rail. In one example, the first BPP rail includes a first automatic power back-feed prevention circuit and the second BPP rail includes a second automatic power back-feed prevention circuit. In one example, the first automatic power back-feed prevention circuit includes a first diode, and the second automatic power back-feed prevention circuit each include a second diode.

In one example, the method further includes generating a time-critical alert signal based on a back power protection (BPP) input signal to the baseband processor (BP). In one example, the back power protection (BPP) input signal is the composite BPP power. In one example, the method further includes transmitting the time-critical alert signal to at least one of the first PMIC and the second PMIC. In one example, the time-critical alert signal is transmitted through a back power protection (BPP) rail. In one example, the baseband processor (BP) includes a back power protection (BPP) alert block. In one example, the BPP alert block is active only when the baseband processor (BP) is powered ON by the second PMIC. In one example, the BPP alert block is a pull down block to set the time-critical alert signal. In one example, the time-critical alert signal is independent of a data bus communication protocol. In one example, the method further includes implementing the logical OR function by using one or more combinational logic elements that includes a AND gate, an OR gate, a NAND gate, a NOR gate, an XOR gate or an inverter gate.

Another aspect of the disclosure provides a System on a Chip (SOC) with back power protection (BPP), the SOC including a first power management integrated circuit (PMIC); an application processor (AP) coupled to the first PMIC, wherein the AP serves as a master processor; a second power management integrated circuit (PMIC) different from the first PMIC; a baseband processor (BP) coupled to the second PMIC, wherein the BP serves as a communications processor; a logical OR function coupled to the baseband processor (BP); a first back power protection (BPP) rail for carrying a first back power protection (BPP) supply output from the first PMIC; and a second back power protection (BPP) rail for carrying a second back power protection (BPP) supply output from the second PMIC, wherein the second BPP rail is a separate rail from the first BPP rail.

In one example, the logical OR function generates a composite BPP power based on the first BPP supply output and the second BPP supply output. In one example, the logical OR function inputs the composite BPP power to the baseband processor (BP). In one example, the SOC further includes a back power protection (BPP) alert block. In one example, the BPP alert block is a pull down block to set a time-critical alert signal. In one example, the BPP alert block is active only when the baseband processor (BP) is powered ON by the second PMIC. In one example, the time-critical alert signal is independent of a data bus communication protocol. In one example, the first BPP rail includes a first automatic power back-feed prevention circuit and the second BPP rail includes a second automatic power back-feed prevention circuit.

Another aspect of the disclosure provides an apparatus for implementing back power protection (BPP) in a System on a Chip (SOC), the apparatus including means for transmitting a first back power protection (BPP) supply output from a first power management integrated circuit (PMIC) to a logical OR function; means for transmitting a second back power protection (BPP) supply output from a second power management integrated circuit (PMIC) to the logical OR function; means for generating a composite BPP power based on the first BPP supply output and the second BPP supply output, wherein the means for generating is the logical OR function; and means for inputting the composite BPP power to a baseband processor (BP), wherein the baseband processor (BP) is coupled to the second PMIC.

In one example, the apparatus further includes means for generating a time-critical alert signal based on a back power protection (BPP) input signal to the baseband processor (BP). In one example, the back power protection (BPP) input signal is the composite BPP power. In one example, the apparatus further includes means for transmitting the time-critical alert signal to at least one of the first PMIC and the second PMIC.

Another aspect of the disclosure provides a computer-readable medium storing computer executable code, operable on a device including at least one processor and at least one memory coupled to the at least one processor, wherein the at least one processor is configured to implement back power protection (BPP) in a System on a Chip (SOC), the computer executable code including instructions for causing a computer to transmit a first back power protection (BPP) supply output from a first power management integrated circuit (PMIC) to a logical OR function; instructions for causing the computer to transmit a second back power protection (BPP) supply output from a second power management integrated circuit (PMIC) to the logical OR function; instructions for causing the computer to use the logical OR function to generate a composite BPP power based on the first BPP supply output and the second BPP supply output; and instructions for causing the computer to input the composite BPP power to a baseband processor (BP), wherein the baseband processor (BP) is coupled to the second PMIC. In one example, the computer-readable medium further includes instructions for causing the computer to generate a time-critical alert signal based on the composite BPP power and to transmit the time-critical alert signal to at least one of the first PMIC and the second PMIC.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A complex electronics system may include a variety of interconnected complex chips. Each System on a Chip (SOC) may include a processor, memory, and external interfaces to perform certain functions such as computation, audio processing, video processing, signal processing, sensing, filtering, etc. Each SOC may also include a power management integrated circuit (PMIC) to supply it with regulated dc power at different voltage levels.

One type of processor is an Application Processor (AP) which is a processor used to implement a desired application. The AP may include AP host software to implement its functions. Another processor type is a Baseband Processor (BP) which is a processor used to implement communication signal processing functions, such as modulation, demodulation, encoding, decoding, compression, decompression, etc. The BP may include BP software to implement its functions.

In one example, the AP, the BP and other peripheral devices may require inter-process communication (IPC) and/or control signaling among the various devices. One common implementation of this communications requirement is a common multi-drop data bus. A multi-drop bus is a shared transmission medium with a plurality of access points, known as drops. For example, all devices, including the AP and BP and their associated PMICs, communicate over a common multi-drop data bus. In one example, the usage of a common multi-drop data bus may lessen the input-output (I/O) pin count of the SOC I/O pin counts may be regarded as a limited chip resource.

In one example, the use of the common multi-drop data bus may complicate the system response during certain transient events. For example, if one of the devices on the data bus is in a power-off state, control signaling carried on the data bus may be disrupted. Disruption of transmission on the data bus may cause signal corruption and/or improper system operation. Also, a hardware fault, such as CMOS latchup, may be induced by spurious data bus activity which may lead to improper system start-up.

In one example, the AP host software may provide the overall control of data communication on the data bus. However, this implementation may block data bus communication for a time duration while the AP host software usurps the data bus capacity.

Figure 1:
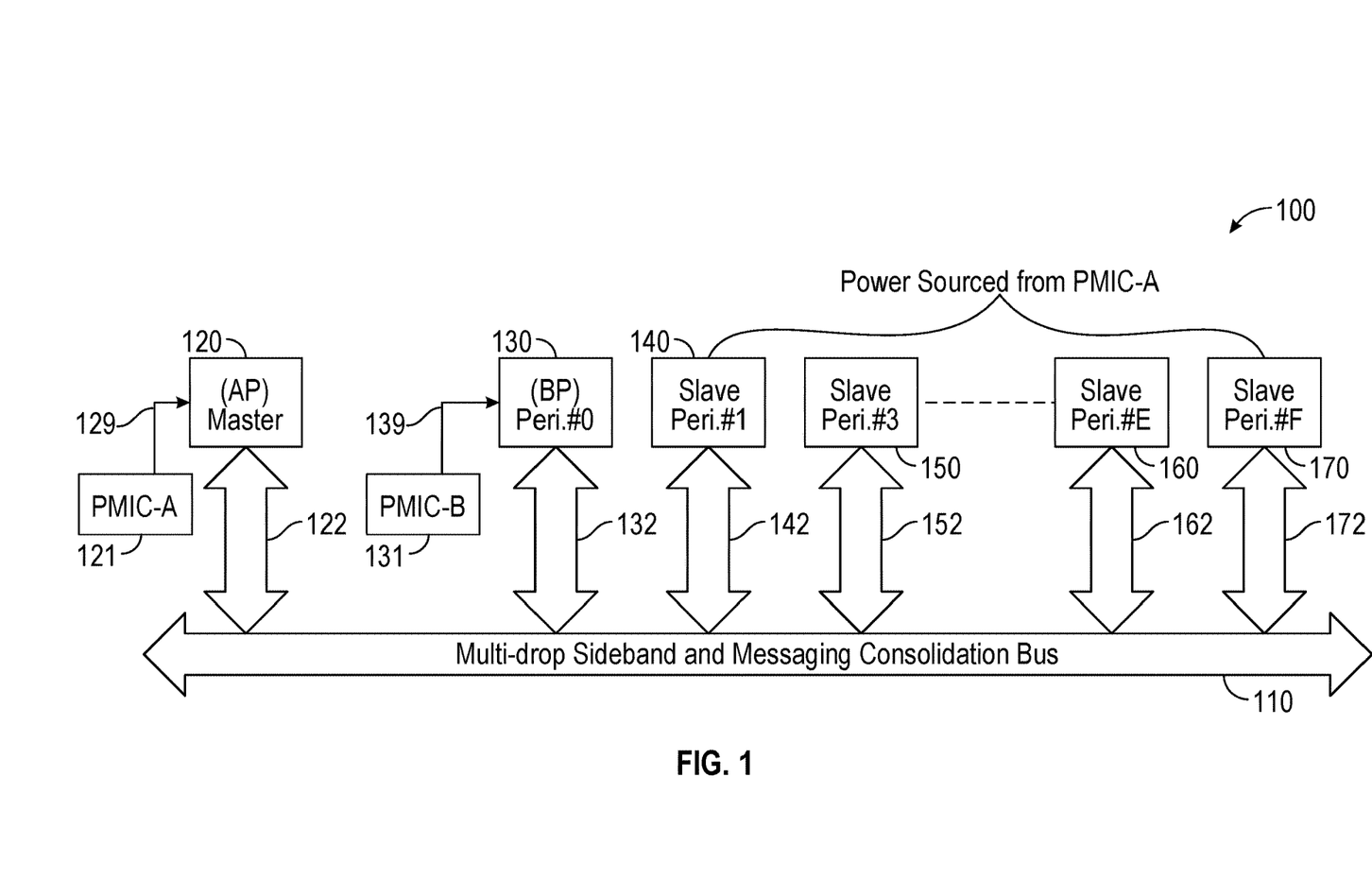
FIG. 1 illustrates a first example of a System on a Chip (SOC) architecture with common multi-drop data bus for inter-process communication (IPC).

FIG. 1 illustrates a first example 100 of a System on a Chip (SOC) architecture with common multi-drop data bus for inter-process communication (IPC). An application processor (AP) 120 serves as a master processor and connects to a common multi-drop data bus 110 via a first drop 122. A first power management integrated circuit (PMIC-A) 121 manages dc power for the application processor (AP) 120. In one example, a first dc power rail 129 supplies dc power from the PMIC-A 121 to AP 120. A baseband processor (BP) 130 serves as a communications processor and connects to the common multi-drop data bus 110 via a second drop 132.

A second power management integrated circuit (PMIC-B) 131 manages dc power for the baseband processor (BP) 130. In one example, a second dc power rail 139 supplies dc power from the PMIC-B 131 to BP 130. The common multi-drop data bus 110 may also connect to a plurality of other processors such as a slave peripheral #1 140 via a third drop 142, a slave peripheral #3 150 via a fourth drop 152, a slave peripheral #E 160 via a fifth drop 162, slave peripheral #F 170 via a sixth drop 172, etc. Although four example slave peripherals are shown in FIG. 1, one skilled in the art would understand that more or less quantities of slave peripherals are within the scope and spirit of the present disclosure. In one example, the PMIC-B 131 may also manage dc power for the plurality of other processors.

In one example, the application processor (AP) 120 is a host processor. In one example, the baseband processor (BP) 130 may be a mobile data modem (MDM). In one example, the BP 130 may be in a power-collapsed state. For example, the power-collapsed state means that dc power is suppressed. In the power-collapsed state, communication over the common multi-drop data bus 110 may be halted to prevent two conditions; complementary metal oxide semiconductor (CMOS) latchup in the BP 130 and data corruption on the common multi-drop data bus 110.

In one example, in the absence of back power protection (BPP), CMOS latchup in the BP 130 and data corruption on the common multi-drop data bus 110 during a transition to the power-collapsed state may be avoided by executing the following exemplary mitigation strategy:

1. Within an OFF time period T0 and an ON time period T1, interconnecting input/output (I/O) pins on the BP 130 should not be set to a HIGH logic level (e.g. logic level=1). In one example, this first step may create a constraint at the SOC architecture level. For example, additional hardware components may need to be added which increases cost.
2. If the BP 130 is required to power cycle while other processors are active, the AP 120 ensures that all devices connected to the BP 130 are directed to set their I/O pins to a LOW logic level (e.g. logic level=0). In one example, this action ensures that no back feed occurs to the BP 130 as it enters a momentary power OFF phase during the power cycle. In one example, this second step may result in software complexity.
3. All devices connected to the BP 130 resume communication activity to the BP 130 on their respective drops only after the BP 130 has finished primary boot loader (PBL) and has indicated its readiness to the AP 120 from its secondary boot loader (SBL) space. In one example, this third step may add delay in the SOC architecture's readiness.

In one example, the BP 130 is placed in Airplane mode to minimize dc power consumption and prolong battery life. However, the SOC architecture may not power-collapse the BP 130 such that there is additional dc power consumption.

Figure 2:
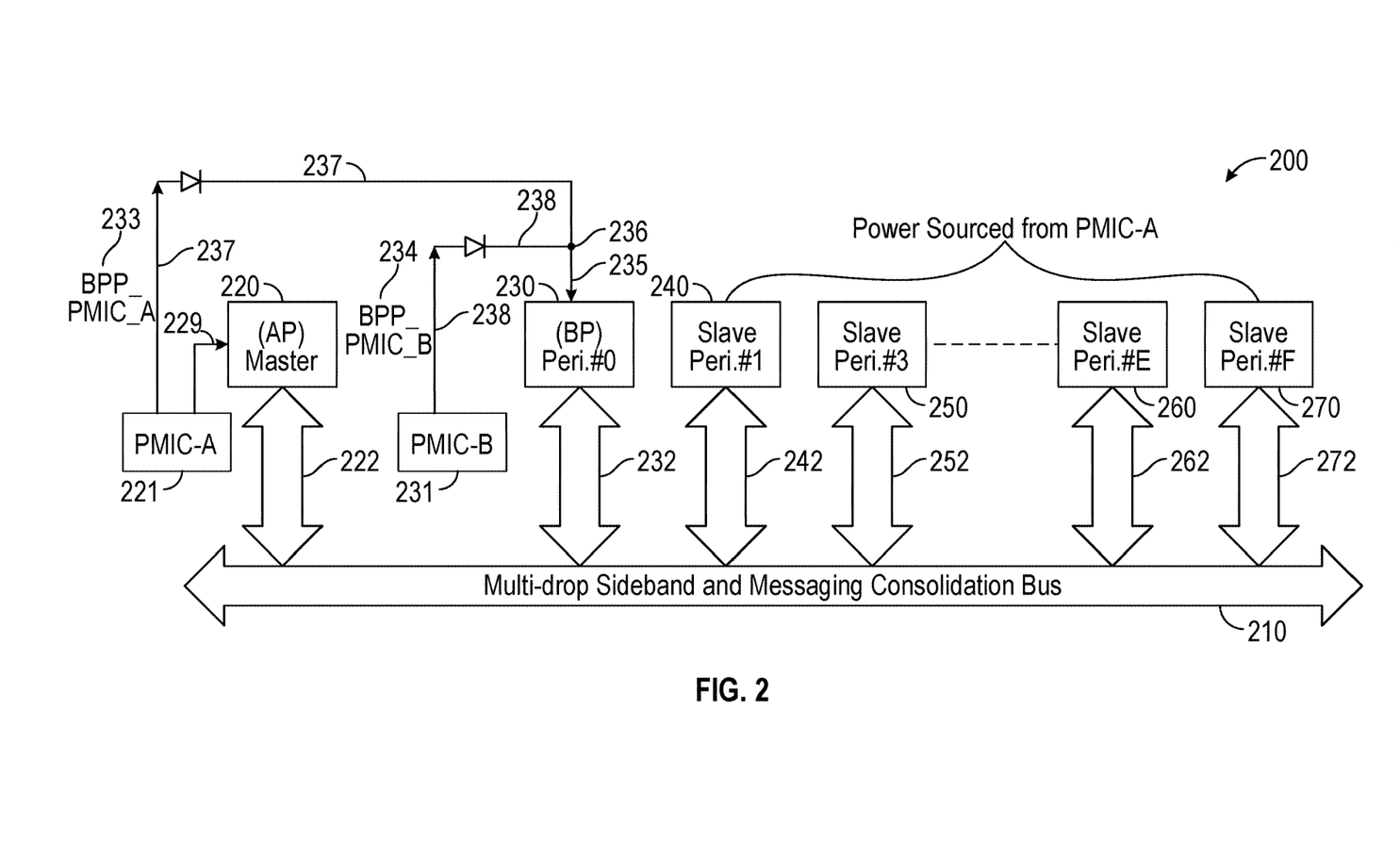
FIG. 2 illustrates a second example of a System on a Chip (SOC) architecture with common multi-drop data bus for inter-process communication (IPC).

FIG. 2 illustrates a second example 200 of a System on a Chip (SOC) architecture with common multi-drop data bus for inter-process communication (IPC). In one example, the SOC architecture includes a SOC with multiple processors. In another example, the SOC architecture includes multiple SOCs wherein each SOC may include one or more processors. An application processor (AP) 220 serves as a master processor and connects to a common multi-drop data bus 210 via a first drop 222. A first power management integrated circuit (PMIC-A) 221 manages dc power for the application processor (AP) 220. In one example, a first dc power rail 229 supplies dc power from the PMIC-A 221 to AP 220. A baseband processor (BP) 230 serves as a communications processor and connects to the common multi-drop data bus 210 via a second drop 232. In one example, the AP and BP reside in one SOC. In another example, the AP resides in a first SOC and the BP resides in a second SOC, wherein the first SOC and the second SOC are part of the SOC architecture.

A second power management integrated circuit (PMIC-B) 231 manages dc power for the baseband processor (BP) 230. The common multi-drop data bus 210 also connects to a plurality of other processors such as slave peripheral #1 240 via a third drop 242, slave peripheral #3 250 via a fourth drop 252, slave peripheral #E 260 via a fifth drop 262, slave peripheral #F (270) via a sixth drop 272, etc. Although four example slave peripherals are shown in FIG. 2, one skilled in the art would understand that more or less quantities of slave peripherals are within the scope and spirit of the present disclosure. In addition, PMIC-B 231 may also manage dc power for the plurality of other processors.

In one example, the application processor (AP) 220 is a host processor. In one example, the baseband processor (BP) 230 may be a mobile data modem (MDM). In one example, the common multi-drop data bus 210 is a multi-drop sideband and messaging consolidation bus. In one example, the BP 230 may be in a power-collapsed state. For example, the power-collapsed state means that dc power is suppressed. In the power-collapsed state, communication over the common multi-drop data bus 210 may be halted to prevent two conditions; complementary metal oxide semiconductor (CMOS) latchup in the BP 230 and data corruption on the common multi-drop data bus 210.

In one example, the first power management integrated circuit (PMIC-A) 221 provides a first back power protection (BPP) supply output BPP_PMIC_A 233 on a first back power protection (BPP) rail 237. For example, the first back power protection (BPP) supply output BPP_PMIC_A 233 includes automatic power back-feed prevention. For example, the automatic power back-feed prevention uses a diode on the first back power protection (BPP) rail 237. In one example, the second power management integrated circuit (PMIC-B) 231 provides a second back power protection (BPP) supply output BPP_PMIC_B 234 on a second back power protection (BPP) rail 238. For example, the second back power protection (BPP) supply output BPP_PMIC_B 234 includes automatic power back-feed prevention. For example, the automatic power back-feed prevention uses a diode on the second back power protection (BPP) rail 238. In one example, the first BPP supply output BPP_PMIC_A 233 and the second BPP supply output BPP_PMIC_B 234 are combined to create a composite BPP power 235. In one example, the composite BPP power 235 is created using a logical OR function 236. In one example, the composite BPP power 235 is provided to the baseband processor (BP) 230 as a back power protection (BPP) input.

In one example, the back power protection (BPP) input (which is the composite BPP power 235) is used to manage input/output (I/O) logic levels during transient conditions. In one example, the baseband processor (BP) 230 is powered either by the first BPP rail 237 or the second BPP rail 238 via the logical OR function 236 (i.e., composite BPP power 235). In the event that the second power management integrated circuit (PMIC-B) 231 is turned off, the baseband processor (BP) 230 will still be powered by the first power management integrated circuit (PMIC-A) 221. For example, there would be no back powering the second drop 232 since the BP 230 is powered on if the PMIC-A 221 is on.

Figure 3:
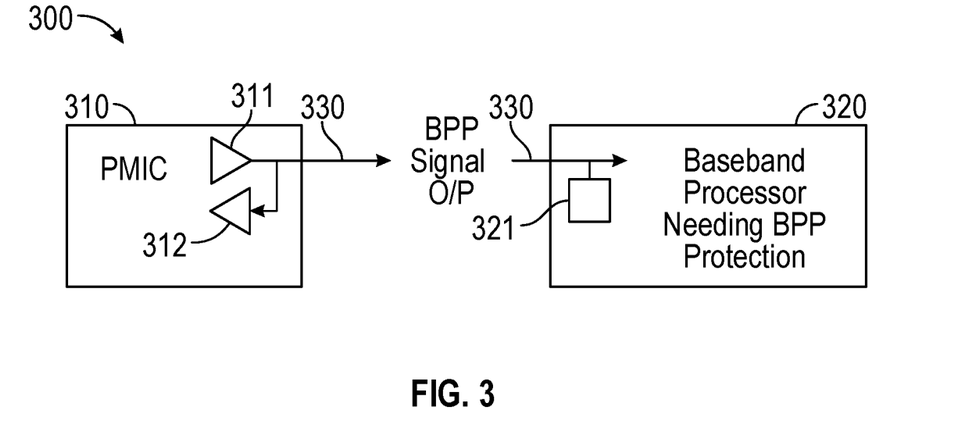
FIG. 3 illustrates an example of a signaling scheme over a back power protection (BPP) rail.

FIG. 3 illustrates an example 300 of a signaling scheme over a back power protection (BPP) rail. A power management integrated circuit (PMIC) 310 includes a BPP voltage source 311 and a BPP monitor 312. In one example, the BPP voltage source 311 is operable with a small current. In one example, the BPP voltage source 311 can tolerate a load at a LOW logic level. In one example, the BPP monitor 312 provides a binary signal. The PMIC 310 connects to a baseband processor (BP) 320 over a rail 330. As shown in FIG. 3, the rail 330 is located between the PMIC 310 and the BP 320. In one example, the rail 330 provides a time-critical alert signal independent of any data bus communication protocol. In one example, the rail 330 carries a BPP signal output. In one example, the baseband processor (BP) 320 includes a BPP alert block 321. In one example, the alert block 321 is active only when the baseband processor (BP) 320 is powered ON by its own PMIC. In one example, the BPP alert block 321 is a pull down block to set the time-critical alert signal. In one example, the BPP signal output reflects the BPP voltage source 311 and is driven by a driver powered by the BPP voltage source 311.

Figure 4:
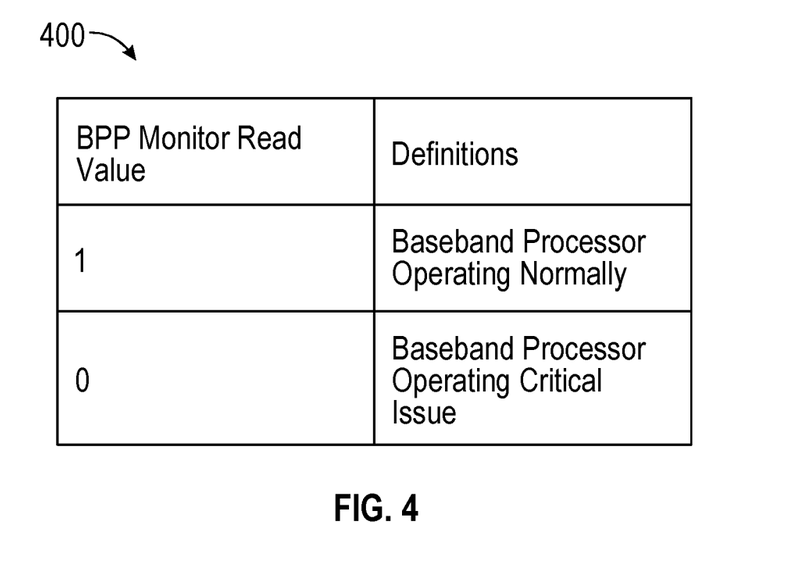
FIG. 4 illustrates an example of a back power protection (BPP) monitor table.

FIG. 4 illustrates an example 400 of a back power protection (BPP) monitor table. The BPP monitor table includes column 1 which lists BPP monitor read values and column 2 which lists the corresponding definitions of the BP monitor read values. For example, a BPP monitor read value of 1 indicates that the baseband processor (BP) is operating nominally. For example, a BPP monitor read value of 0 indicates that the baseband processor (BP) is operating with a critical issue.

Figure 5:
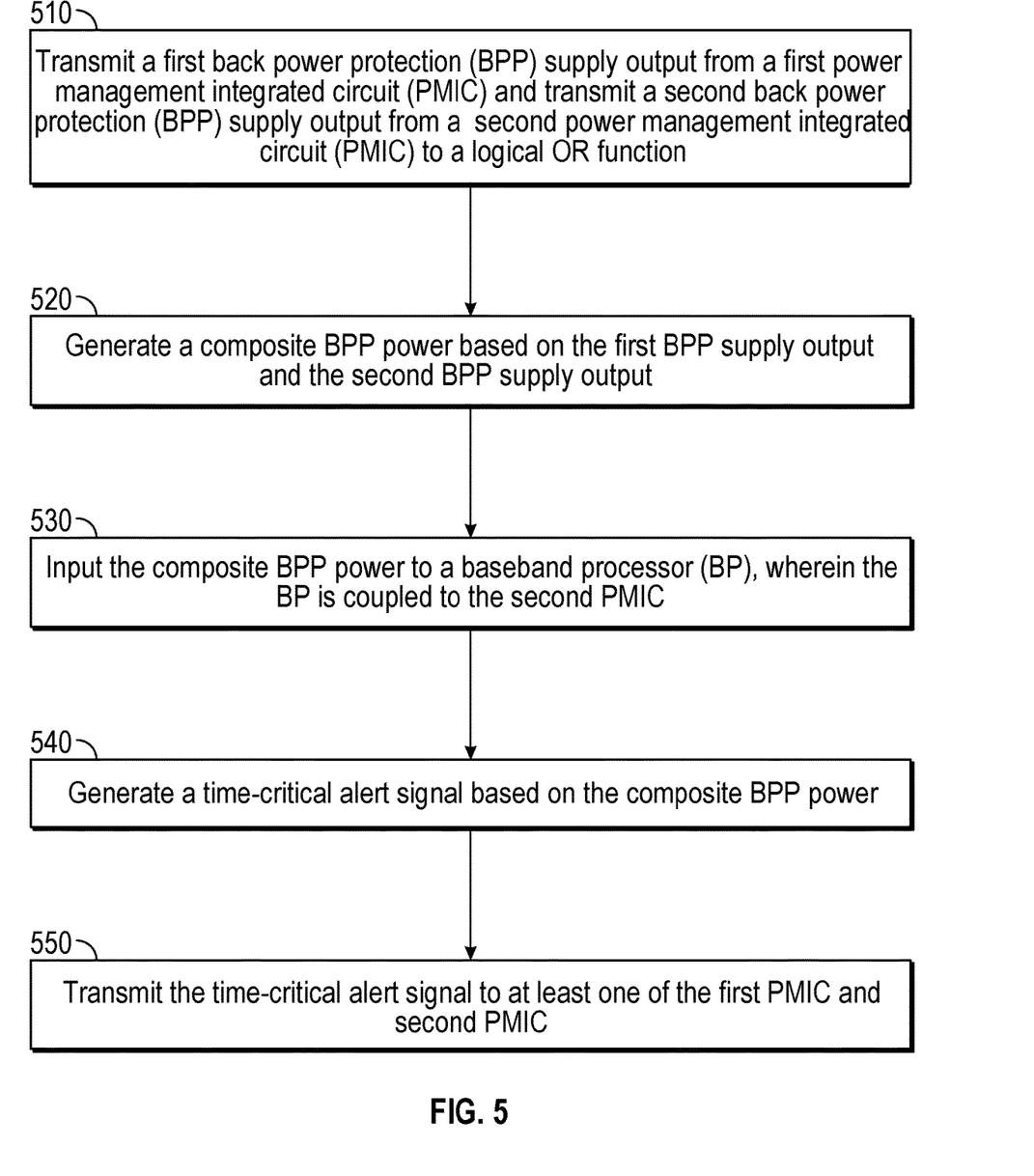
FIG. 5 illustrates an example flow diagram for implementing back power protection (BPP) in a System on a Chip (SOC).

FIG. 5 illustrates an example flow diagram 500 for implementing back power protection (BPP) in a System on a Chip (SOC).

In block 510, transmit a first back power protection (BPP) supply output from a first power management integrated circuit (PMIC) and transmit a second back power protection (BPP) supply output from a second power management integrated circuit (PMIC) to a logical OR function. In one example, the first PMIC is coupled to an application processor (AP) which serves as a master processor and is connected to a common multi-drop data bus in the SOC. In one example, the second PMIC is coupled to a baseband processor (BP) which serves as a communications processor and is also connected to the common multi-drop data bus. In one example, the logical OR function may be implemented by one or more combinational logic elements such as AND gates, OR gates, NAND gates, NOR gates, XOR gates, inverter gates, etc.

In one example, the first BPP supply output is carried on a first BPP rail and the second BPP supply output is carried on a second BPP rail, wherein the first BPP rail is a separate rail from the second BPP rail. In one example, the first BPP rail includes a first automatic power back-feed prevention circuit and the second BPP rail includes a second automatic power back-feed prevention circuit. In one example, the first automatic power back-feed prevention circuit and the second automatic power back-feed prevention circuit each include a diode.

In block 520, generate a composite BPP power based on the first BPP supply output and the second BPP supply output. In one example, the composite BPP power is generated by the logical OR function based on the first BPP supply output and the second BPP supply output In block 530, input the composite BPP power to a baseband processor (BP), wherein the BP is coupled to the second PMIC. In one example, the composite BPP power is used to manage input/output (I/O) logic levels during transient conditions.

In block 540, generate a time-critical alert signal based on a back power protection (BPP) input signal. In one example, the back power protection (BPP) input signal is the composite BPP power. In one example, the baseband processor (BP) includes a BPP alert block. For example, the BPP alert block is active only when the baseband processor (BP) is powered ON by the second PMIC. In one example, the BPP alert block is a pull down block to set the time-critical alert signal.

In block 550, transmit the time-critical alert signal to at least one of the first PMIC and second PMIC. In one example, the time-critical alert signal is transmitted through a back power protection (BPP) rail, for example, through the first back power protection (BPP) rail and/or the second back power protection (BPP) rail. In one example, the time-critical alert signal is independent of any data bus communication protocol. In one example, the time-critical alert signal indicates to the PMICs (e.g., first PMIC, second PMIC) that there exists a critical condition in their associated processors (e.g., application processor (AP), baseband processor (BP)).

In one aspect, one or more of the steps for implementing back power protection (BPP) in a System on a Chip (SOC) in FIG. 5 may be executed by one or more processors which may include hardware, software, firmware, etc. In one aspect, one or more of the steps in FIG. 5 may be executed by one or more processors which may include hardware, software, firmware, etc. The one or more processors, for example, may be used to execute software or firmware needed to perform the steps in the flow diagram of FIG. 14. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. For example, a computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may reside in the processing system, external to the processing system, or distributed across multiple entities including the processing system. The computer-readable medium may be embodied in a computer program product. By way of example, a computer program product may include a computer-readable medium in packaging materials. The computer-readable medium may include software or firmware for implementing back power protection (BPP) in a System on a Chip (SOC). Those skilled in the art will recognize how best to implement the described functionality presented throughout this disclosure depending on the particular application and the overall design constraints imposed on the overall system.

Any circuitry included in the processor(s) is merely provided as an example, and other means for carrying out the described functions may be included within various aspects of the present disclosure, including but not limited to the instructions stored in the computer-readable medium, or any other suitable apparatus or means described herein, and utilizing, for example, the processes and/or algorithms described herein in relation to the example flow diagram.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method for implementing back power protection (BPP) in a System on a Chip (SOC), the method comprising:
    transmitting a first back power protection (BPP) supply output from a first power management integrated circuit (PMIC) to a logical OR function;
    transmitting a second back power protection (BPP) supply output from a second power management integrated circuit (PMIC) to the logical OR function;
    using the logical OR function to generate a composite BPP power based on the first BPP supply output and the second BPP supply output; and
    inputting the composite BPP power to a baseband processor (BP), wherein the baseband processor (BP) is coupled to the second PMIC.

2. The method of claim 1, wherein the first PMIC is coupled to an application processor (AP) and wherein the application processor (AP) serves as a master processor.

3. The method of claim 2, wherein the second PMIC is coupled to the baseband processor (BP) and wherein the baseband processor (BP) serves as a communications processor.

4. The method of claim 3, wherein the application processor (AP) and the baseband processor (BP) are both coupled to a common multi-drop data bus in the SOC.

5. The method of claim 4, further comprising generating a time-critical alert signal based on a back power protection (BPP) input signal to the baseband processor (BP).

6. The method of claim 5, wherein the back power protection (BPP) input signal is the composite BPP power.

7. The method of claim 5, further comprising transmitting the time-critical alert signal to at least one of the first PMIC and the second PMIC.

8. The method of claim 7, wherein the time-critical alert signal is transmitted through a back power protection (BPP) rail.

9. The method of claim 7, wherein the baseband processor (BP) includes a back power protection (BPP) alert block.

10. The method of claim 9, wherein the BPP alert block is active only when the baseband processor (BP) is powered ON by the second PMIC.

11. The method of claim 10 wherein the BPP alert block is a pull down block to set the time-critical alert signal.

12. The method of claim 7, wherein the time-critical alert signal is independent of a data bus communication protocol.

13. The method of claim 1, wherein the first BPP supply output is carried on a first BPP rail and the second BPP supply output is carried on a second BPP rail, wherein the first BPP rail is a separate rail from the second BPP rail.

14. The method of claim 13, wherein the first BPP rail includes a first automatic power back-feed prevention circuit and the second BPP rail includes a second automatic power back-feed prevention circuit.

15. The method of claim 14, wherein the first automatic power back-feed prevention circuit includes a first diode, and the second automatic power back-feed prevention circuit each include a second diode.

16. The method of claim 1, further comprising implementing the logical OR function by using one or more combinational logic elements that includes a AND gate, an OR gate, a NAND gate, a NOR gate, an XOR gate or an inverter gate.

17. A System on a Chip (SOC) with back power protection (BPP), the SOC comprising:
- a first power management integrated circuit (PMIC);
- an application processor (AP) coupled to the first PMIC, wherein the AP serves as a master processor;
- a second power management integrated circuit (PMIC) different from the first PMIC;
- a baseband processor (BP) coupled to the second PMIC, wherein the BP serves as a communications processor;
- a logical OR function coupled to the baseband processor (BP);
- a first back power protection (BPP) rail for carrying a first back power protection (BPP) supply output from the first PMIC; and
- a second back power protection (BPP) rail for carrying a second back power protection (BPP) supply output from the second PMIC, wherein the second BPP rail is a separate rail from the first BPP rail.

18. The SOC of claim 17, wherein the logical OR function generates a composite BPP power based on the first BPP supply output and the second BPP supply output.

19. The SOC of claim 18, wherein the logical OR function inputs the composite BPP power to the baseband processor (BP).

20. The SOC of claim 19, further comprising a back power protection (BPP) alert block.

21. The SOC of claim 20, wherein the BPP alert block is a pull down block to set a time-critical alert signal.

22. The SOC of claim 21, the BPP alert block is active only when the baseband processor (BP) is powered ON by the second PMIC.

23. The SOC of claim 21, wherein the time-critical alert signal is independent of a data bus communication protocol.

24. The SOC of claim 17, wherein the first BPP rail includes a first automatic power back-feed prevention circuit and the second BPP rail includes a second automatic power back-feed prevention circuit.

25. An apparatus for implementing back power protection (BPP) in a System on a Chip (SOC), the apparatus comprising:
- means for transmitting a first back power protection (BPP) supply output from a first power management integrated circuit (PMIC) to a logical OR function;
- means for transmitting a second back power protection (BPP) supply output from a second power management integrated circuit (PMIC) to the logical OR function;
- means for generating a composite BPP power based on the first BPP supply output and the second BPP supply output, wherein the means for generating is the logical OR function; and
- means for inputting the composite BPP power to a baseband processor (BP), wherein the baseband processor (BP) is coupled to the second PMIC.

26. The apparatus of claim 25, further comprising means for generating a time-critical alert signal based on a back power protection (BPP) input signal to the baseband processor (BP).

27. The apparatus of claim 26, wherein the back power protection (BPP) input signal is the composite BPP power.

28. The apparatus of claim 27, further comprising means for transmitting the time-critical alert signal to at least one of the first PMIC and the second PMIC.

29. A non-transitory computer-readable medium storing computer executable code, operable on a device comprising at least one processor and at least one memory coupled to the at least one processor, wherein the at least one processor is configured to implement back power protection (BPP) in a System on a Chip (SOC), the computer executable code comprising:
- instructions for causing a computer to transmit a first back power protection (BPP) supply output from a first power management integrated circuit (PMIC) to a logical OR function;
- instructions for causing the computer to transmit a second back power protection (BPP) supply output from a second power management integrated circuit (PMIC) to the logical OR function;
- instructions for causing the computer to use the logical OR function to generate a composite BPP power based on the first BPP supply output and the second BPP supply output; and
- instructions for causing the computer to input the composite BPP power to a baseband processor (BP), wherein the baseband processor (BP) is coupled to the second PMIC.

30. The non-transitory computer-readable medium of claim 29, further comprising instructions for causing the computer to generate a time-critical alert signal based on the composite BPP power and to transmit the time-critical alert signal to at least one of the first PMIC and the second PMIC.

* * * * *